United States Patent Office 3,202,214
Patented Aug. 24, 1965

3,202,214
PREPARATION AND USE OF SODIUM
SILICATE GELS
Homer C. McLaughlin, Jr., Duncan, Okla., assignor to
Halliburton Company, a corporation of Delaware
No Drawing. Filed Apr. 18, 1960, Ser. No. 22,681
22 Claims. (Cl. 166—30)

This invention relates generally to the preparation and use of gels of the sodium silicate type. More particularly, the invention relates to gelling agents and gel-forming compositions and to methods utilizing the same in preparing sodium silicate gels and further relates to methods wherein such compositions and gels are utilized in treating earth and like formation.

It is anticipated that the invention will be most widely applied in connection with treating operations performed for the purpose of sealing-off, plugging or otherwise obstructing the pore spaces and other openings in a permeable section or zone of an earth formation. Thus, the invention is applicable to grouting fluids and to grouting operations performed on earth strata which is penetrated, for example, by a bore hole or a mine shaft, or which is otherwise accessible for the injection of a treating fluid thereinto. Also, the invention may find wide application in connection with certain sealing or plugging operations performed in oil and gas wells or the like, such as where it is desired to seal-off, plug or otherwise obstruct openings providing fluid passageways in a permeable formation penetrated by the bore of the well.

It has been known for some time that sodium silicate gels may be employed in well treating and other operations wherein plugging deposits are to be formed in permeable earth formations. Thus, in U.S. Patent No. 1,421,706, which issued July 4, 1922, to Ronald Van Auken Mills, it is disclosed that commercial sodium silicate or water glass in aqueous solution may be reacted with, for example, an aqueous solution of calcium chloride to produce cementing precipitates in wells. Other reagents which are described in the Mills patent as reacting similarly with an aqueous sodium silicate solution are: magnesium chloride in aqueous solution, commercial hydrochloric acid, calcium sulphate or calcium oxide in finely divided particles in suspension in water or mud, and calcium hydroxide in solution in water.

One object of the present invention is to provide improved gelling agents for use in preparing sodium silicate gels and the like.

Another object of the invention is to provide improved compositions and methods useful in performing grouting operations on accessible earth strata, such as on a permeable formation penetrated by a bore hole or mine shaft.

Another object of the invention is to provide improved compositions and methods useful in certain well treating operations, such as those performed to seal-off, plug or otherwise obstruct openings in a permeable formation penetrated by the bore of the well.

Another and more specific object of the invention is to provide improved sodium silicate gels and gel-forming compositions having slow or delayed gelling characteristics.

Another specific object of the invention is to provide improved sodium silicate gels and gel-forming compositions, improved methods of preparing such gels, and improved methods utilizing such compositions and gels in treating earth and like formations.

A further object of the invention is to provide improved slow-gelling compositions and improved methods utilizing such compositions in treating oil and gas wells or the like, such as to seal-off or otherwise obstruct openings and passageways in a permeable section or zone of an earth formation penetrated by the bore of the well.

The foregoing and additional objects and advantages are attained by the invention, which involves the concept of utilizing, as gelling agents, substances which in the presence of an aqueous sodium silicate solution, which is alkaline, are capable of reacting to produce acid or hydrogen ions, resulting in lowering of the pH of the sodium silicate solution and thereby causing a gel to be produced.

In one way of proceeding, gelation of the sodium silicate solution is effected by adding thereto an agent which undergoes hydrolysis. Examples of suitable agents which are capable of undergoing hydrolysis in the presence of a commercial sodium silicate solution are the esters such as triacetin, glycol diacetate, diglycol diacetate, methyl acetate, ethyl acetate, Carbitol acetate, ethyl formate, ethyl oxalate, triethyl citrate, glycerin carbonate, propylene carbonate, and butyrolactone. Another suitable agent is ethyl chloroformate, which is a combined ester and acid anhydride. Yet another suitable agent is the amide, formamide, which may be employed to particular advantage in certain treating operations, as will appear more fully hereinafter.

In another way of proceeding, also in accordance with the invention, gelation of the sodium silicate solution if effected by adding thereto an agent which undergoes the Cannizzaro reaction. Examples of suitable agents which are capable of undergoing the Cannizzaro reaction in the presence of a commercial sodium silicate solution are the aldehydes having no hydrogen atom on the alpha carbon atom, such as formaldehyde, glyoxal, benzaldehyde, furfural and trimethylacetaldehyde.

In yet another way of proceeding in accordance with the invention, gelation of the sodium silicate solution is effected by adding thereto a reducing agent and an oxidizing agent. Examples of suitable reducing agents are organic compounds, such as the alcohols and aldehydes, which are capable of underoging oxidation in the presence of an oxidizing agent included therewith in the sodium silicate solution, and which oxidize to produce organic acids. The organic compound is preferably of the type which is relatively easily oxidized. While water solubility of the organic compound is desirable, it is not absolutely necessary. Examples of organic compounds which are suitable for use are methanol, formaldehyde, glycerin, ethylene glycol, glucose, sucrose, furfural and glyoxal.

The oxidizing agent included with the reducing agent is preferably water soluble and, of course, is selected to be capable of oxidizing the particular compound being used. Examples of oxidizing agents which have been found suitable for use are the peroxides, the persulfates, perborates and hydrogen peroxide.

One particular advantage of the invention resides in the fact that each of these gelling agents provides some delay in the gelling reaction and in the feature which permits the gelling agent to be selected to provide the delay which is necessary or desirable for best results in accordance with the conditions which prevail in the particular operation involved.

For example, where a grouting fluid is prepared, the need for a slow or delayed acting gelling agent may not be as great as where the invention is used in preparing a treating fluid which is to be used in performing a well operation at a considerable depth below the surface of the ground. Also, there will be instances where the prevailing temperature and other conditions will make one gelling agent more suitable for use than another.

While the rate of gelation will depend upon various factors, including the prevailing temperature and pressure conditions, it is emphasized that each of the gelling agents herein disclosed acts indirectly in that the sodium silicate solution is gelled by first producing acid or hydrogen ions which result in lowering the pH of the solution. The delay may range from only a few seconds up to several hours. However, if the solution were contacted with an acid directly, gelation would ordinarily be substantially instantaneous. In fact, one difficulty which has been encountered in attempting to effect gelatin in this manner has been that of being unable to mix relatively large quantities of the solution and acid due to gelation occurring so quickly that all the ingredients cannot be stirred together.

In carrying out a grouting operation, such as in treating earth strata located near the surface of the ground or near the opening of a mine shaft, it may be necessary to first drill a relatively short or shallow bore hole into the strata and then inject the grouting fluid through the bore hole into the section or zone to be treated. Satisfactory results may be obtained in these and other operations using gelling agents which give at most only a few minutes delay, since the time required for the mixing and placement of the gel-forming composition may be relatively short.

In carrying out a well treating operation, on the other hand, it will ordinarily be necessary or desirable to employ a gelling agent which gives a sufficiently long delay to allow for the time required in pumping the gel-forming composition into the well, as well as in preparing the composition and in applying pressure to inject it into the treated zone or formation after reaching the desired depth in the well.

Where the delay obtainable using a particular gelling agent is not considered sufficient to allow ample time for pumping the gel-forming composition into a well, it may be necessary or desirable to introduce the gelling agent and the sodium silicate solution separately into the well. For example, the gelling agent and sodium silicate solution may be introduced into the well as substantially separated parts of a continuous fluid stream, such as by including a quantity of water as a spacer fluid in the stream between the ingredients of the gel-forming composition. Where this procedure is followed, the delay obtainable due to the slow or delayed action of the gelling agent after contacting the sodium silicate solution in the well or adjacent strata may nonetheless afford particular advantages. For example, the delay enables the ingredients of the treating fluid to penetrate more deeply and uniformly into the permeable zone or formation prior to the viscosity of the combined ingredients becoming so great as to hinder or prevent further penetration.

In laboratory tests which have been conducted, delays of the order of 30 to 45 minutes have been obtained using certain of the esters, particularly methyl acetate and ethyl acetate, at temperatures ranging up to about 100 degrees Fahrenheit. It is believed that these esters will be satisfactory for usage in many grouting operations conducted under low temperature conditions where long pumping and handling times are not needed.

Where longer delays are sought, formamide is recommended among the hydrolyzing gelling agents. Tests have shown that delays ranging up to more than 6 hours are obtainable using formamide at temperatures of 100 degrees or less, while delays of the order of 40 to 180 minutes were obtained at temperatures ranging up to 140 degrees Fahrenheit. It is believed that this material will be satisfactory for usage in grouting operations and also in certain well treating operations.

Where even longer delays are sought, and also where higher temperatures are anticipated, formaldehyde may be used. When used alone, formaldehyde undergoes the Cannizzaro reaction, giving in laboratory tests delay ranging from 44 minutes at 200 degrees up to almost 24 hours at 74 degrees. When used with hydrogen peroxide, an oxidizing agent, formaldehyde gave much shorter delays, up to about 8 minutes, where ample hydrogen peroxide was present. Otherwise, very long delays, up to about 24 hours, were obtained using formaldehyde and hydrogen peroxide, but the gels in these instances were considerably weaker.

In laboratory tests which were conducted using sodium persulfate as an oxidizing agent with various reducing agents, it was found that gelling times ranging up to more than 2 hours are obtainable using the organic compounds listed hereinabove.

A typical treating mixture using reducing and oxidizing agents was prepared as follows.

(1) Dissolved 6.6 grams of glucose in 33 milliliters of water.
(2) Dissolved 10 grams of sodium persulfate in 34 milliliters of water.
(3) Added the sodium persulfate solution to 33 milliliters of sodium silicate solution sold commerically under the name "Diamond Alkali 40 Grade."
(4) Added the glucose solution to the combined sodium silicate and sodium persulfate solutions.
(5) This mixture produced a very tough gel in approximately 25 minutes at 77 degrees Fahrenheit.

In certain applications it may be necessary to follow special mixing procedures to avoid the likelihood of local dehydration of the sodium silicate when the gelling agent is combined therewith. To this end, it is proposed that, where the gelling agent to be used is relatively readily soluble in water, it is diluted to some extent prior to adding it to the sodium silicate solution. It is preferred that the dilution be accomplished by using one of the two volumes of water ordinarily used to dilute the commercially available concentrated sodium silicate solution. This special mixing procedure may be advantageously employed, for example, where the gelling agent is formamide or methyl acetate, but will ordinarily not be needed where the gelling agent is ethyl acetate, since the latter agent is relatively less readily soluble in water.

While the invention has been described herein with particular reference to certain embodiments and ingredients thereof, it is understood that these are by way of example and that the scope of the invention is best defined in the appended claims.

What is claimed is:

1. A gel-forming composition consisting essentially of an aqueous sodium silicate solution and a gelling agent therefor, said gelling agent being selected from the group consisting of (1) esters and lactones capable of undergoing hydrolysis in the presence of the sodium silicate solution, and (2) reducing agent-oxidizing agent admixtures capable of undergoing an oxidation-reduction reaction in the presence of the sodium silicate solution.

2. A composition as claimed in claim 1 wherein said gelling agent is a lactone which will undergo hydrolysis in the presence of the sodium silicate solution.

3. A composition as claimed in claim 2 wherein said gelling agent is selected from the group consisting of triacetin, glycol diacetate, diglycol diacetate, methyl acetate, ethyl acetate, Cabitol acetate, ethyl formate, ethyl oxalate, triethyl citrate, glycerin carbonate, propylene carbonate, butyrolactone, and ethyl chloroformate.

4. A composition as claimed in claim 1 wherein said gelling agent consists essentially of a reducing agent and an oxidizing agent.

5. A composition as claimed in claim 4 wherein said oxidizing agent is selected from the peroxides consisting of the persulfates, the perborates and hydrogen peroxide.

6. A composition as claimed in claim 4 wherein said reducing agent is selected from the group consisting of organic compounds capable upon oxidation of producing organic acids.

7. A composition as claimed in claim 6 wherein said reducing agent is selected from the group consisting of methanol, formaldehyde, glycerin, ethylene glycol, glucose, sucrose, furfural and glyoxal.

8. In a method of treating an earth formation or the like to obstruct openings therein, the step of placing in said opening a composition consisting essentially of an aqueous sodium silicate solution and a gelling agent therefor, said gelling agent being selected from the group consisting of (1) esters and lactones capable of undergoing hydrolysis in the presence of the sodium silicate solution, and (2) reducing agent-oxidizing agent admixtures capable of undergoing an oxidation-reduction reaction in the presence of the sodium silicate solution.

9. In a grouting operation performed on relatively readily accessible, permeable earth strata, the step of injecting into said strata a grouting fluid consisting essentially of an aqueous sodium silicate solution and a gelling agent therefor, said gelling agent being selected from the group consisting of (1) esters and lactones capable of undergoing hydrolysis in the presence of the sodium silicate solution, and (2) reducing agent-oxidizing agent admixtures capable of undergoing an oxidation-reduction reaction in the presence of the sodium silicate solution.

10. In a well treating method, the step of introducing into the well a gel-forming composition consisting essentially of an aqueous sodium silicate solution and a gelling agent therefor, said gelling agent being selected from the group consisting of (1) esters and lactones capable of undergoing hydrolysis in the presence of the sodium silicate solution, and (2) reducing agent-oxidizing agent admixtures capable of undergoing an oxidation-reduction reaction in the presence of the sodium silicate solution.

11. The process as defined in claim 10, wherein said gelling agent is a lactone capable of undergoing hydrolysis in the presence of the sodium silicate solution.

12. The process as defined in claim 10, wherein the gelling agent consists essentially of a reducing agent and an oxidizing agent, the reducing agent comprising an organic compound capable of undergoing oxidation in the presence of said oxidizing agent and said sodium silicate to produce an organic acid for reaction with the sodium silicate to gel the same.

13. A gel-forming composition consisting essentially of an aqueous sodium silicate solution and a gelling agent therefor, said gelling agent comprising an ester capable of undergoing hydrolysis in the presence of the sodium silicate solution.

14. The composition of claim 13 wherein said ester is methyl acetate.

15. The composition of claim 13 wherein said ester is ethyl acetate.

16. The composition of claim 13 wherein said ester is triacetin.

17. In a method of treating an earth formation or the like to obstruct openings therein, the step of placing in said openings a composition consisting essentially of an aqueous sodium silicate solution and a gelling agent therefor, said gelling agent comprising an ester capable of undergoing hydrolysis in the presence of the sodium silicate solution.

18. In a grouting operation performed on relatively accessible, permeable earth strata, the step of injecting into said strata a grouting fluid consisting essentially of an aqueous sodium silicate solution and a gelling agent therefor, said gelling agent comprising an ester capable of undergoing hydrolysis in the presence of the sodium silicate solution.

19. In a well-treating method, the step of introducing into the well a gel-forming composition consisting essentially of an aqueous sodium silicate solution and a gelling agent therefor, said gelling agent comprising an ester capable of undergoing hydrolysis in the presence of the sodium silicate solution.

20. The process of claim 19 wherein said gelling agent is methyl acetate.

21. The process of claim 19 wherein said gelling agent is ethyl acetate.

22. The process of claim 19 wherein said gelling agent is triacetin.

References Cited by the Examiner
UNITED STATES PATENTS

| | | | |
|---|---|---|---|
| 2,176,266 | 10/39 | Malmberg | 166—29 |
| 2,236,147 | 3/41 | Lerch et al. | 166—29 |
| 2,365,039 | 12/44 | Andresen | 166—29 |
| 2,402,588 | 6/46 | Andresen | 166—29 |
| 2,612,954 | 10/52 | Hamilton | 166—29 |
| 2,858,892 | 11/58 | Carpenter | 166—29 |
| 3,028,340 | 4/62 | Gandon et al. | 252—317 |

CHARLES E. O'CONNELL, *Primary Examiner.*

BENJAMIN BENDETT, *Examiner.*